Patented Oct. 11, 1949

2,484,300

UNITED STATES PATENT OFFICE 2,484,300

PROCESS OF PREPARING A SULFUR CONTAINING PHTHALOCYANINE DYESTUFF

Raymond L. Mayhew, Phillipsburg, N. J., assignor to General Aniline & Film Corporation, New York, N. Y., a corporation of Delaware No Drawing. Application December 4, 1947, Serial No. 789,753

3 Claims. (Cl. 260—314.5)

This invention relates to a process of preparing a sulfur-containing copper phthalocyanine dyestuff, more particularly, to improvements in the preparation thereof through reduction of copper phthalocyanine tetrasulfonylchloride.

It has heretofore been proposed in U. S. P. 2,342,663, to prepare sulfur-containing dyestuffs by reducing a copper phthalocyanine sulfonyl chloride with zinc in the presence of a mineral acid and oxidizing the resulting copper mercaptophthalocyanine to the disulfide stage. The copper phthalocyanine sulfonylchlorides can be obtained by heating a copper phthalocyanine sulfonic acid or an equal weight of copper phthalocyanine with chlorosulfonic acid as described in U. S. P. 2,219,330 (British Patent 515,637).

The aforementioned patent in its specific teaching describes a process of reducing copper phthalocyanine tetrasulfonylchloride using proportions of zinc which when calculated on the weight of the copper phthalocyanine content of the tetrasulfonylchloride compound involved are in the ratios of 10:1 and 5:1 respectively. Expressed in other terms and calculated on the same basis, the proportions of zinc used in the reduction are, respectively, 7.34 and 3.67 times the theoretical requirement of zinc for the reduction which is 12 mols of zinc for each mol of the copper phthalocyanine tetrasulfonylchloride. The content of copper phthalocyanine in the copper phthalocyanine tetrasulfonylchloride involved in the reduction process can be directly ascertained by taking as its value the weight of the copper phthalocyanine used in preparing the tetrasulfonylchloride. Alternatively, it can be calculated from the copper phthalocyanine tetrasulfonic acid, when such is used in preparing the tetrasulfonylchloride compound.

When in the process of the patent, as I have found, the amount of zinc employed for the reduction of the (copper phthalocyanine) tetrasulfonylchloride drops to or below the defined ratio of 5:1, incomplete reduction of the tetrasulfonylchloride results. Accordingly, for complete reduction of the tetrasulfonylchloride a larger proportion of zinc is necessary, for example, a ratio of 10:1 as defined. This larger ratio of zinc in turn involves a greater expenditure of mineral acid and these factors of increased cost go to make a relatively expensive reduction process. It is accordingly desirable to obtain a less expensive method for the reduction.

I have now found that by replacing zinc in the above process with iron and using as little as 2 parts of iron to 1 part of the copper phthalocyanine content of the tetrasulfonylchloride to be reduced, complete reduction of the copper phthalocyanine tetrasulfonyl chloride can be obtained. This amount of iron can also be defined, and on the same basis, as being 1.7 times the theoretical requirement of iron for the reduction which is 12 mols of iron for each 1 mol of copper phthalocyanine tetrasulfonylchloride.

The fact that such a relatively small proportion of iron would suffice to obtain complete reduction of the copper phthalocyanine tetrasulfonylchloride is surprising and was not to be expected since in an analogous reaction for the preparation of p-thiocresol by reduction of p-toluene sulfonylchloride with iron in the presence of hydrochloric acid, only 50% yield of reduction product was obtained on using an amount of iron equal to 4.18 times the theoretical requirement thereof calculated on the content of toluene in the p-toluene sulfonylchloride employed. Ann. 356,326 (1907).

The reduction step of the process of the present invention can be carried out by use of a suitable form of iron, for example, filings, borings or powder. If desired, iron by hydrogen may be used which is a highly purified form of iron. As would be expected, the rate of reduction tends to be more rapid when iron of smaller particle size is used.

The temperature and the time of reduction vary inversely. For example, it has been found that copper phthalocyanine tetrasulfonyl chloride may be reduced at approximately room temperature in about 10 hours or at a temperature of 45–50° C. in about 1 hour.

The mercapto reduction product is oxidized to the disulfide stage to obtain the sulfur dyestuff. The sulfur dyestuff can be applied for the dyeing of cellulosic materials such as rayon and cotton from sodium sulfide solution in the same way as for other sulfur dyestuffs, and gives green dyeings of good fastness to light and washing.

Oxidation of the mercapto compound to the disulfide stage also serves as a convenient way of separating the dyestuff from the reaction mass since the disulfide compound is insoluble in the aqueous acid reaction liquor. The oxidation and the concurrent precipitation can be effected by stirring the reduction mass with a mild oxidizing agent such as hydrogen peroxide, ferric chloride, potassium hypoiodite or atmospheric oxygen. The precipitation takes place slowly at room temperature and much more rapidly at temperatures of 50 to 100° C.

In the case of small quantities of reduction product, oxidation and precipitation can be substantially completely effected by stirring the reduction mixture in contact with air for one hour at 75-90° C. The bright green insoluble sulfur dyestuff which at this stage can be recovered from the reaction liquor by filtration, is obtained in practically quantitative yield.

Although the sulfur dyestuff appears to be contaminated with a small amount of unreacted iron or other inert material from the iron products, the contaminant does not appear to adversely affect the dyeing properties of the dyestuff. The contaminant may be removed by dissolving the dyestuff in reducing media such as sodium sulfide solution, filtering to remove the adulterant, acidifying with a mineral acid such as hydrochloric or sulfuric acids, heating the mixture in contact with air and recovering the precipitated sulfur dyestuff by filtration.

The invention is illustrated by the following specific examples to which, however, it is not intended that it be limited. Parts are by weight:

Example 1

20 grams of copper phthalocyanine is slowly stirred into 240 grams of chlorosulfonic acid and the mixture heated at 145-150° C. for 3 hours with good agitation. The reaction mixture is cooled and, with stirring, poured onto 600 grams of ice mixed with 112 grams of hydrochloric acid, the residual chlorosulfonic acid being hydrolyzed to hydrochloric acid. To this suspension is added, with efficient stirring, 40 grams of iron borings, during which time the temperature rises to 40° C. The mixture is maintained at 45-50° C. for 1 hour. It is then raised to 75-90° C., at which temperature it is stirred in contact with the air for 1 hour. The precipitated product is separated by filtration. It weighed 28.6 grams. When dissolved in aqueous sodium sulfide solution, the product dyes cellulosic fabrics in dull blue shades which, on exposure to atmospheric oxygen, change to a jade green of good fastness to light and washing.

Example 2

20 grams of copper phthalocyanine is slowly stirred into 248 grams of chlorosulfonic acid and the resulting mixture heated at 100-110° C. for 4 hours. The reaction mixture is then cooled and poured over 600 grams of ice mixed with 112 grams of hydrochloric acid. To this suspension is added with stirring, 40 grams of iron filings and the mixture heated to 45 to 50° C. for 1 hour. The temperature is then raised to 70-80° C. and the mixture heated in contact with the air for a further hour. The precipitated sulfur dyestuff is filtered from the reaction liquor, washed free of acid with water, and dried at 60-80° C. The product when employed in dyeing cellulosic materials as in Example 1, yields a much bluer color than obtained therein.

Example 3

To a reaction mixture prepared as in Example 1, and still containing ice, is added 40 grams of highly purified iron (iron by hydrogen). The temperature of the suspension rises slowly to room temperature. It is stirred for 12 hours at 20° C., heated to 50-60° C., and at this temperature stirred in contact with the air for 1 hour. The product was isolated and tested as in Example 1 and gave dyeings on cellulosic material of similar shade and properties.

I claim:

1. In the process of preparing a sulfur dyestuff by reducing copper phthalocyanine tetrasulfonylchloride with a metal in the presence of a mineral acid and subsequently oxidizing the resulting copper mercaptophthalocyanine to the disulfide stage, the improvement which comprises conducting the reduction with iron as the metal and using a quantity of iron equal to 1.7 times the theoretical requirement thereof for the reduction calculated on the copper phthalocyanine content of the copper phthalocyanine tetrasulfonylchloride.

2. A process of preparing a sulfur dyestuff which comprises reducing copper phthalocyanine tetrasulfonylchloride with iron in the presence of hydrochloric acid, the amount of iron initially present being in the proportion of 2 parts of iron to 1 part of the copper phthalocyanine content of the copper phthalocyanine tetrasulfonylchloride, and oxidizing the resulting copper mercaptophthalocyanine to the disulfide stage.

3. A process of preparing a sulfur dyestuff which comprises adding hydrochloric acid and 2 parts of iron per part of the starting copper phthalocyanine to a reaction mixture containing copper phthalocyanine tetrasulfonylchloride obtained by heating chlorosulfonic acid with copper phthalocyanine and in which the residual chlorosulfonic acid has been hydrolyzed, carrying out the reduction of the copper phthalocyanine tetrasulfonylchloride with the iron and hydrochloric acid and oxidizing the resulting copper mercaptophthalocyanine to the disulfide stage.

RAYMOND L. MAYHEW.

REFERENCES CITED

The following references are of record in the file of this patent:

UNITED STATES PATENTS

| Number | Name | Date |
|---|---|---|
| 2,342,663 | Haddock et al. | Feb. 29, 1944 |

OTHER REFERENCES

Annalen, vol. 356, page 326 (1907). Copy in Sci. Library.